United States Patent
Barefoot et al.

(10) Patent No.: US 10,885,060 B2
(45) Date of Patent: **\*Jan. 5, 2021**

(54) ON-DEMAND FILE SYNCHRONIZATION

(75) Inventors: Christopher B. Barefoot, Chapel Hill, NC (US); Joseph Kubik, Cary, NC (US); Timothy S. Rich, Cary, NC (US); David M. Wendt, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 673 days.

This patent is subject to a terminal disclaimer.

(21) Appl. No.: 13/407,499

(22) Filed: Feb. 28, 2012

(65) Prior Publication Data

US 2013/0226872 A1    Aug. 29, 2013

(51) Int. Cl.
*G06F 16/27* (2019.01)
*G06F 16/178* (2019.01)

(52) U.S. Cl.
CPC ............ *G06F 16/27* (2019.01); *G06F 16/178* (2019.01)

(58) Field of Classification Search
CPC ................................................ G06F 17/30165
USPC ........................................................ 707/638
See application file for complete search history.

(56) References Cited

U.S. PATENT DOCUMENTS

| | | |
|---|---|---|
| 7,139,780 B2 | 11/2006 | Lee et al. |
| 7,743,026 B2 | 6/2010 | Saliba et al. |
| 8,005,710 B2 | 8/2011 | Vishnumurty et al. |
| 2005/0091448 A1 | 4/2005 | Nakatani et al. |
| 2006/0136511 A1* | 6/2006 | Ngo et al. ...................... 707/203 |
| 2007/0078978 A1* | 4/2007 | Arnold .................... H04L 47/10 709/224 |

(Continued)

FOREIGN PATENT DOCUMENTS

| | | |
|---|---|---|
| JP | 06175902 | 6/1994 |
| WO | 2007089854 A1 | 8/2007 |

OTHER PUBLICATIONS

Notification of Transmittal of the International Search Report and the Written Opinion of the International Searching Authority dated Jul. 23, 2013 in corresponding WO Application No. PCT/IB2013/051343, 7 pgs.

(Continued)

*Primary Examiner* — Dawaune A Conyers
(74) *Attorney, Agent, or Firm* — David W. Victor; Konrad Raynes Davda & Victor LLP

(57) ABSTRACT

Techniques are described for managing access and synchronization of one or more files of a document management system stored locally at a client device. The techniques may include receiving, by a document management system executing on a server device, a file update notification message from a first client device to notify the document management system that a file was modified by the first client device. The file update notification message may include an indication of the modified file on the first client device without including the modified file. The document management system may receive a file editing request from a second client device to request the file. In response, the document management system may send a file upload request to the first client device, receive the modified file from the first client device, and send the modified file to the second client device.

16 Claims, 3 Drawing Sheets

(56) References Cited

U.S. PATENT DOCUMENTS

| | | | |
|---|---|---|---|
| 2007/0118597 A1* | 5/2007 | Fischer | G06F 9/542 709/204 |
| 2007/0220417 A1* | 9/2007 | Mathew | G06F 17/3089 715/234 |
| 2008/0141365 A1* | 6/2008 | Soegtrop | G06F 16/93 726/21 |
| 2009/0049053 A1* | 2/2009 | Barker et al. | 707/10 |
| 2009/0106247 A1* | 4/2009 | Daughtry et al. | 707/8 |
| 2009/0112880 A1* | 4/2009 | Oliveira | H04L 67/1097 707/10 |
| 2009/0138528 A1* | 5/2009 | Manzano | G06F 17/30174 707/203 |
| 2012/0330887 A1 | 12/2012 | Young et al. | |
| 2013/0173530 A1* | 7/2013 | Laron | G06F 16/1734 707/608 |
| 2013/0238558 A1 | 9/2013 | Barefoot et al. | |

OTHER PUBLICATIONS

Office Action from U.S. Appl. No. 13/871,959, dated Feb. 26, 2015, 19 pp.
Response to the Office Action dated Feb. 26, 2015, from U.S. Appl. No. 13/871,959, filed May 26, 2015, 11 pp.
Final Office Action from U.S. Appl. No. 13/871,959, dated Jul. 29, 2015, 24 pp.
Office Action from U.S. Appl. No. 13/871,959, dated Nov. 2, 2015, 24 pp.
Final Office Action from U.S. Appl. No. 13/871,959, dated Nov. 2, 2015 24 pgs.
Response to Final Office Action dated Nov. 2, 2015, filed Feb. 2, 2016 10 pgs.
Response to the Office Action dated Feb. 25, 2016, from U.S. Appl. No. 13/871,959, filed May 24, 2016, 6 pp.
Office Action from U.S. Appl. No. 13/871,959, dated Feb. 25, 2016, 23 pp.
Final Office Action from U.S. Appl. No. 13/871,959, dated Aug. 10, 2016, 26 pp.
Final Office Action from U.S. Appl. No. 13/871,959, dated Oct. 14, 2016, 25 pp.
Amendment in Response to Office Action dated Feb. 8, 2017, from U.S. Appl. No. 13/871,959, filed May 8, 2017, 12 pp.
Office Action from U.S. Appl. No. 13/871,959, dated Feb. 8, 2017, 24 pp.
Response to Final Office Action dated Oct. 14, 2016, from U.S. Appl. No. 13/871,959, filed Dec. 14, 2016, 11 pp.
Advisory Action from U.S. Appl. No. 13/871,959, dated Dec. 23, 2016, 3 pp.
Response to Final Office Action dated Oct. 14, 2016, from U.S. Appl. No. 13/871,959, filed Jan. 16, 2017, 11 pp.
Response to Office Action dated Dec. 14, 2017, from U.S. Appl. No. 13/871,959, filed Mar. 13, 2018, 16 pp.
Final Office Action from U.S. Appl. No. 13/871,959, dated Aug. 22, 2017, 26 pp.
Response to Office Action dated Aug. 22, 2017, from U.S. Appl. No. 13/871,959, filed Oct. 17, 2017, 15 pp.
Advisory Action from U.S. Appl. No. 13/871,959, dated Nov. 7, 2017, 3 pp.
Office Action from U.S. Appl. No. 13/871,959, dated Dec. 14, 2017, 23 pp.
Final Office Action from U.S. Appl. No. 13/871,959, dated Aug. 3, 2018, 31 pp.
Office Action from U.S. Appl. No. 13/871,959, dated Feb. 21, 2019, 22 pp.
Response to Office Action dated Feb. 21, 2019, from U.S. Appl. No. 13/871,959, filed May 21, 2019, 9 pp.
Notice of Allowance dated Jul. 8, 2020, pp. 20, for U.S. Appl. No. 13/871,959.
Office Action dated Dec. 30, 2019, pp. 28, for U.S. Appl. No. 13/871,959.
Response dated Mar. 30, 2020, pp. 14, to Office Action dated Dec. 30, 2019, pp. 28, for U.S. Appl. No. 13/871,959.
Response dated May 24, 2016, pp. 6, to Office Action dated Feb. 25, 2016, pp. 22, for U.S. Appl. No. 13/871,959.
Response dated Oct. 11, 20169, pp. 11, to Final Office Action dated Aug. 10, 2016, pp. 26, for U.S. Appl. No. 13/871,959.
Final Office Action dated Aug. 22, 2017, pp. 26, for U.S. Appl. No. 13/871,959.
Response dated Oct. 17, 2017, pp. 15, to Final Office Action dated Aug. 22, 2017, pp. 26, for U.S. Appl. No. 13/871,959.
Amend dated Nov. 5, 2018, pp. 16, to Final Office Action dated Aug. 3, 2018, pp. 31, for U.S. Appl. No. 13/871,959.
Amend dated Oct. 23, 2019, pp. 11, to Final Rejection dated Aug. 19, 2019, pp. 23, for U.S. Appl. No. 13/871,959.

\* cited by examiner

ON-DEMAND FILE SYNCHRONIZATION

BACKGROUND

This disclosure relates to software systems, and more specifically, to document management systems.

Document management systems may be used to maintain and organize electronic documents. Such document management systems are typically used in a collaborative file sharing context, thus enabling multiple users to access and edit a single electronic document using multiple computing devices connected using a computing network. Document management systems may support many, e.g., hundreds or thousands, of concurrent users. For instance, document management systems may be used in conjunction with sophisticated, large-scale enterprise software systems, such as inventory management systems, budget planning systems, order management systems, sales force management systems, business intelligence tools, enterprise reporting tools, project and resource management systems, and other enterprise software systems.

Typically, files within a document management system are stored at a central location, such as a server. A user computing device (e.g., a client device) may transmit a request to the server to access a file for editing. In response, the server typically sends a copy of the file that is stored at the central server to the client device. In addition, the server may associate a "lock" for the file with the requesting client device, thereby ensuring that editing requests originating from other client devices are rejected until the editing client "unlocks" the file. Files are typically modified locally by the client device and uploaded back to the central server that maintains the current version of the file.

BRIEF SUMMARY

Techniques are described herein in which a document management system manages access to a current version of a file that is stored locally on a client device. Conventionally, current versions of files within a document management system are stored at a central location, such as a server. As an example, a user of a client device may "lock" a file for editing and download the file to the client device, thereby effectively "checking out" the file Upon completion of the editing process, a user of the client device "checks in" the file by uploading the modified file to the server and releasing the lock. As another example, client-side software may monitor the file for changes and automatically upload the file or the incremental changes to the server when the changes occur. As such, the server typically maintains the current version of the file when the file is not being edited.

In contrast, techniques are described herein in which the current version of a file associated with a document management system is stored locally at a client device. That is, the current version of the file is stored by the client device that most recently edited the file even though the user has finished editing the file and has effectively checked the file back into the document management system. Rather than transmit an updated file to the server upon completion of the editing process, or each time the file is saved, the techniques allow the updated file to be transmitted on demand when requested by other users for subsequent editing. As such, techniques described herein may reduce the amount of network communications required to manage access to a current version of a file in a document management system. This may be advantageous when, for example, network bandwidth is low, file sizes are large, or the system includes a large number of client devices.

In one example, a method includes receiving, by a document management system executing on one or more processors of a server device, a file update notification message from a first client device to notify the document management system that a file was modified by the first client device. The file update notification message may include an indication of the modified file on the first client device without including the modified file. The method further includes receiving, by the document management system, a file editing request from a second client device to request the file from the document management system, and responsive to receiving the file editing request from the second client device, sending, by the document management system, a file upload request to the first client device to request the modified file from the first client device. The method further includes receiving, by the document management system, the modified file from the first client device, and sending, by the document management system, the modified file to the second client device.

In another example, a computer-readable storage medium is encoded with instructions that, when executed, cause one or more processors of a server device to receive, by a document management system executing on the one or more processors, a file update notification message from a first client device to notify the document management system that a file was modified by the first client device. The file update notification message may include an indication of the modified file on the first client device without including the modified file. The computer-readable storage medium is further encoded with instructions that, when executed, cause the one or more processors of the server device to receive a file editing request from a second client device to request the file from the document management system, and responsive to receiving the file editing request from the second client device, send a file upload request to the first client device to request the modified file from the first client device. The computer-readable storage medium is further encoded with instructions that, when executed, cause the one or more processors of the server device to receive the modified file from the first client device, and send the modified file to the second client device.

In another example, a server device includes one or more processors, and a document management system executable by the one or more processors to receive a file update notification message from a first client device to notify the document management system that a file was modified by the first client device. The file update notification message may include an indication of the modified file on the first client device without including the modified file. The document management system is further executable by the one or more processors to receive a file editing request from a second client device to request the file from the document management system, and responsive to receiving the file editing request from the second client device, send a file upload request to the first client device to request the modified file from the first client device. The document management system is further executable to receive the modified file from the first client device and send the modified file to the second client device.

In another example, a method includes modifying a file by a client device, storing the modified file at a computer-readable storage media of the client device, and sending, by the client device, a file update notification message to a document management system executing on one or more processors of a server device to notify the document management system that the client device modified the file. The file update notification message may include an indication of the modified file stored at the computer-readable storage media of the client device without including the modified file.

In another example, a computer-readable storage medium is encoded with instructions that, when executed, cause one or more processors of a client device to modifying a file, storing the modified file at the computer-readable storage medium, and send a file update notification message to a document management system executing on one or more processors of a server device to notify the document management system that the client device modified the file. The file update notification message may include an indication of the modified file stored at the computer-readable storage media of the client device without including the modified file.

In another example, a client device includes one or more processors, one or more applications executable by the one or more processors to modify a file, and a computer-readable storage medium operable to store the modified file. The client device further includes a file system monitor executable by the one or more processors to send a file update notification message to a document management system executing on one or more processors of a server device to notify the document management system that the client device modified the file. The file update notification message may include an indication of the modified file stored at the computer-readable storage medium of the client device without including the modified file.

The details of one or more aspects of this disclosure are set forth in the accompanying drawings and the description below. Other features, objects, and advantages of the disclosure will be apparent from the description and drawings, and from the claims.

DETAILED DESCRIPTION

Figure 1:
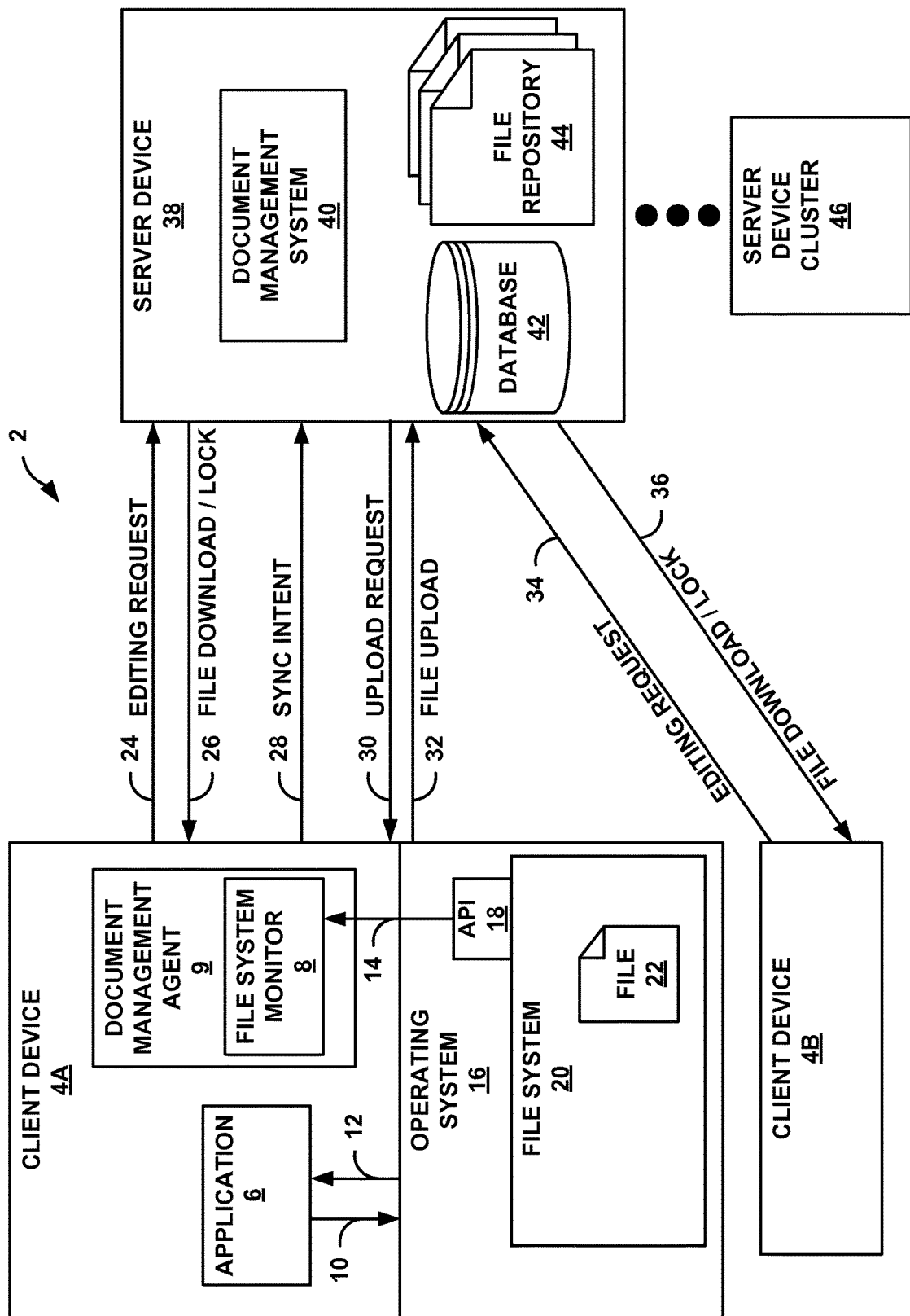
FIG. 1 is a block diagram illustrating an example communication system for synchronizing files of a document management system, in accordance with one or more aspects of this disclosure.

Techniques are described herein in which a document management system manages synchronization and access to a current version of a file that is stored locally on a client device. As described herein, a first client device communicates with the document management system to lock a file for editing and download the file from a server. The first client device stores the file locally and modifies the file at the request of the user. However, upon the file being saved or released by the user upon completion of the editing process, the first client sends a synchronization intent message to the server rather than transmit the modified file to the server. The synchronization intent message notifies the document management system executing on the server that the file has been locally modified and the user has taken an action indicating an intent to synchronize the file with the server.

In response to receiving a subsequent request to edit the file from a second client device, the server determines whether the first client device has unlocked the file for editing. When the server determines that the file is locked, the server may transmit an unlock request message to the first client device to request the first client device to release the lock. In some examples, as when the user is not finished editing the file, the user may provide an input indicating that the first client device is not to release the lock. In response, the first client device may transmit an unlock rejection message to the server device. When the first client device does not relinquish the lock, the server may reject the file editing request received from the second client device.

In other examples, in response to an unlock request message or at the request of the user upon completion of the editing process, the first client device may transmit an unlock confirmation message to the server to release the lock and effectively check the file back into the document management system. Rather than transmit the updated file to the server upon checking in the file, the first client device maintains the updated version of the file locally. When the server determines that the file is unlocked, the server sends a file upload request to the first client device. In turn, the first client device transmits the updated version of the file to the server. The server then sends the updated file to the second client device for editing.

The techniques described herein may reduce the amount of network communications required to manage access to and synchronization of a current version of a file in a document management system. For instance, the synchronization intent message may include an indication of the modified document without including the modified file itself. As such, the amount of network communications required to notify the server of the updated file may be reduced. Moreover, the techniques enable a current version of a file to be stored locally at a client device and transmitted to the server on demand, thereby possibly further reducing the amount of network communications required for document synchronization.

FIG. 1 is a block diagram illustrating an example communication system 2 for synchronizing one or more files of a document management system 40. Document management system 40 may be any software application that manages synchronization of one or more files among client devices. Document management system 40 enables multiple clients to work collaboratively on an electronic file. For example, document management system 40 may manage synchronization of a file among client devices by controlling each client's access to edit a current version of the file. As such, document management system 40 prevents concurrent editing of a file that may result in one client overwriting changes made to the file by another client.

Document management system 40 may control access to edit a file using a file locking mechanism. As an example, document management system 40 may receive a request from a client to edit a file. In response, document management system 40 may determine whether the file is currently "locked" by another client device. If the file is locked, document management system 40 may reject the editing request until the file is "unlocked" by the client device associated with the lock. As such, document management system 40 ensures that only one client device edits the file at any given time, thereby preventing possible conflicting modifications to the file that may result in one client overwriting changes made by another client.

In the example of FIG. 1, document management system 40 interacts with client devices 4A and 4B (collectively "client devices 4") to manage access to and synchronization of file 22. Although described with respect to client device 4A, client devices 4A and 4B include substantially similar components to perform substantially similar functionality. In addition, although described for exemplary purposes with respect to two client devices, it should be noted that the techniques described herein may be applied with respect to many client devices, e.g., hundreds, thousands, or more client devices. Similarly, although illustrated with respect to server device 38, document management system 40 may be part of, or distributed among, multiple server devices, such as server device cluster 46 illustrated in FIG. 1.

Client devices 4, in some examples, may include or be part of a portable computing device (e.g., a mobile phone, netbook, laptop, personal digital assistant (PDA), tablet device, and the like), desktop computer, or server. Client devices 4A and 4B may be the same or different type of device. As an example, client device 4A may be a laptop computer and client device 4B may be a mobile phone. As another example, client device 4A and client device 4B may each be desktop computers.

In the example of FIG. 1, client device 4A executes application 6 to enable a user to perform one or more tasks. For example, application 6 may include one or more word processing applications, spreadsheet applications, slide presentation applications, and the like. Application 6 may enable a user to retrieve and update a file, such as a text file associated with a word processing application. In some examples, application 6 may include or be part of a suite of tools that may enable a user to contribute, retrieve, analyze, and visualize information. For instance, application 6 may be part of a large-scale enterprise software system, such as inventory management systems, budget planning systems, order management systems, or other types of enterprise software systems. Although discussed herein with respect to a single application, techniques of this disclosure are applicable to multiple applications 6.

As illustrated in FIG. 1, client device 4A includes operating system 16 and file system 20. Operating system 16 manages hardware resources (e.g., processors, memory, peripheral devices such as a keyboard or mouse) and software components of client device 4A. Operating system 16 provides an interface between such hardware and software components, thereby providing an operating environment for execution of application processes (e.g., application 6, document management agent 9, file system monitor 8, and the like). For instance, operating system 16 may expose one or more application programming interfaces (API) to enable application 6 and file system monitor 8 to interact with hardware resources and software components executing on client device 4A. Such APIs may include, among others, inter-process communication mechanisms and system calls.

File system 20 may be considered a component of operating system 16 that allocates and organizes storage space for data on an underlying storage media, such as random access memory (RAM), read only memory (ROM), flash memory, a hard disk, or other computer-readable storage media. File system 20 may organize data using a folder or directory structure. File system 20 may be considered an abstraction to enable operating system 16 to store, retrieve, and update data. As such, file system 20 provides an interface between operating system 16 and the underlying physical storage media upon which data such as file 22 is stored. Examples of file system 20 include, but are not limited to, File Allocation Table (FAT), Fast File System (FFS), and New Technology File System (NTSF).

In the example of FIG. 1, application 6 issues system calls 10 and 12 to cause operating system 16 to interact with file system 20. As an example, system calls 10 may include file management commands to cause file system 20 to save, write, or otherwise modify file 22. System calls 12 may include file management commands to enable application 6 to retrieve information from file 22, such as file open, file read, and other similar file system management commands. As such, operating system 16 provides an interface between file system 20 and applications executing on client device 4A (e.g., application 6, document management agent 9, file monitor system 8, etc.) to enable such applications to interact with file 22 stored on an underlying physical storage media of client device 4A.

As described herein, document management system 40 performs operations to manage access and synchronization of file 22 among client devices 4 to enable client devices 4 to collaboratively edit file 22. As illustrated in FIG. 1, document management system 40 receives editing request 24 from client device 4A. Client device 4A may connect to server 38 using a communications network, such as a local-area network (LAN), a wide-area network such as the Internet, an enterprise network, a telephone network such as a cellular telephone network, or one or more other types of networks.

Editing request 24 includes an indication of a file for which client device 4A requests access to edit. In this example, editing request 24 includes an indication of file 22, such as a file name, file version, or other unique identifier of file 22. In some examples, editing request 24 may include an identifier of client device 4A, a user of client device 4A, or both. For instance, editing request 24 may include a unique username of a user of client device 4A, a media access control (MAC) address of a network interface of client device 4A, an Internet Protocol (IP) address and port number, or other identifiers to facilitate communications and identification of client device 4A. As another example, client device 4A may "login" to document management system 40 prior to sending editing request 24. In such an example, when logging in, client device 4A may provide identification information of client device 4A, a user of client device 4A, or both, to enable document management system 40 to identify client device 4A as the requesting client.

In response to receiving editing request 24, document management system 40 accesses database 42 to identify a storage location of a current version of file 22 and whether file 22 is currently locked for editing by a client device. Examples of database 42 include relational databases, multi-dimensional databases, hierarchical databases, object-oriented databases, or one or more other types of databases. Database 42 may be part of server device 38, one or more server devices of server device cluster 46, or distributed among one or more of server device 38 and server device cluster 46. In general, database 42 may include any organizational structure that enables document management system 40 to associate a current version of a file with a storage location of the file. That is, document management system 40 accesses database 42 to identify the device (e.g., a client device such as one or more of client devices 4, server device 38, one or more servers of server cluster 46, etc.) that stores the current version of file 22 (i.e., the most recently modified version of file 22), and whether the file is currently locked for editing by a client device.

For instance, after receiving editing request 24, document management system 40 may access database 42 and determine that file 22 is locked for editing (i.e., checked out) by another client device, such as client device 4B. In such an example, document management system 40 may reject editing request 24, thereby preventing client device 4A from editing file 22. In the example of FIG. 1, document management system 40 accesses database 42 to determine that file 22 is unlocked and that the most recently modified version of file 22 is stored in file repository 44 of server device 38. As such, document management system 40 retrieves file 22 from file repository 44 and transmits file 22 to client device 4A. File repository 44 may include any combination of file system, computer-readable storage media, and the like, capable of storing and retrieving data such as file 22. In some examples, file repository 44 may be part of database 42. Similarly, file repository 44 may be part of server device 38, server device cluster 46, or any combination thereof.

In addition to transmitting file 22 to client device 4A, document management system 40 updates database 42 to associate an editing lock for file 22 with client device 4A. For instance, document management system 40 may update database 42 to associate a file editing lock with an indication of file 22 (e.g., a file name, a file identification number, etc.) and an indication of client device 4A. As such, document management system 40 may reject editing requests received from client devices other than client device 4A until file 22 is unlocked (e.g., client device 4A checks the file back into document management system 40).

After receiving file download 26 including file 22 from document management system 40, client device 4A may modify file 22 and store the modified file within local memory of client device 4A. As an example, file 22 may be a text file. A user of client device 4A may modify file 22 using application 6 (e.g., a word processing application). For instance, the user may modify the text of file 22 and cause application 6 to issue a file save command (e.g., system call 10) to operating system 16. In response, operating system 16 may cause file system 20 to store, modify, or otherwise update file 22 in local memory of client device 4A. In such an example, file system monitor 8 determines that file 22 has been modified and transmits synchronization intent message 28 to document management system 40.

Document management agent 9 may be any software application executing on client device 4A to operate in conjunction with document management system 40 to synchronize, lock, unlock, or otherwise control access and editing of one or more files associated with document management system 40 (e.g., file 22). Document management agent 9 may be tightly coupled to document management system 40. In some examples, document management agent 9 may be part of an application or suite of tools installed on client device 4A to interact with document management system 40.

As illustrated in FIG. 1, document management agent 9 may include file system monitor 8. File system monitor 8 may be any software application executing on client device 4A to determine that one or more files (e.g., file 22) is modified using file system 20. File system monitor 8 may be tightly coupled to operating system 16, file system 20, or both. For instance, operating system 16 may expose API 18 to enable file system monitor 8 to register for file modification events. In response to receiving a file modification system call (e.g., a file save, file write, or other file modification system call), operating system 16 raises a file modification event. File system monitor 8 is notified of the file modification event using API 18. As another example, API 18 may include a callback function that executes one or more functions of file system monitor 8 in response to a file modification event.

In the example of FIG. 1, application 6 issues file modification system call 10 to operating system 16. In response, operating system 16 causes file system 20 to update file 22 in local memory of client device 4A. In addition, operating system 16 raises file modification event 14 that notifies file system monitor 8 using API 18.

In response to file modification event 14, file system monitor 8 causes a network interface of client device 4A to transmit synchronization intent message 28 to document management system 40. Synchronization intent message 28 notifies document management system 40 that a version of file 22 stored at file repository 44 of server device 38 is no longer the most current version of file 22. As such, synchronization intent message 28 may be considered a file update notification message to notify document management system 40 that a file (e.g., file 22) was modified by client device 4A.

Synchronization intent message 28 includes an indication of file 22 to enable document management system 40 to identify file 22 as the modified file stored locally at client device 4A. Such an indication may include a file name, a file identification number, a file name and file version number, or other unique identifier of file 22. In some examples, synchronization intent message 28 includes meta-data relating to file 22, such as a time that client device 4A modified file 22, a version number of file 22, an identifier of a user of client device 4A, and the like. In certain examples, synchronization intent message 28 includes the indication of file 22 and meta-data relating to file 22 without including any portion of file 22. That is, in certain examples, synchronization intent message 28 includes the indication of file 22, meta-data relating to file 22, or both, without including file 22 itself or any portion of the modification to file 22.

Document management system 40 receives synchronization intent message 28 from client device 4A. In response, document management system 40 updates database 42 to associate a storage location of a current version of file 22 with client device 4A. As illustrated in FIG. 1, document management system 40 receives editing request 34 from client device 4B. Similar to editing request 24, editing request 34 includes an indication of file 22 to request access to edit file 22. In addition, editing request 34 may include one or more of an indication of client device 4B, a user of client device 4B, or other similar information. In response to receiving editing request 34, document management system 40 accesses database 42 to identify a storage location of a current version of file 22 and whether file 22 is currently locked for editing by a client device.

In the example of FIG. 1, document management system 40 accesses database 42 to determine that client device 4A stores the most recently modified version of file 22 (i.e., the current version of file 22) based on synchronization intent message 28 received from client device 4A. In some examples, document management system 40 may determine that file 22 is currently locked for editing by client device 4A (e.g., file 22 is checked out of document management system 40 for editing by client device 4A). In such examples, document management system 40 may reject editing request 34, thereby preventing client device 4B from editing the current version of file 22. In the illustrated example of FIG. 1, document management system 40 determines that client device 4A has relinquished the lock associated with file 22. For instance, at the request of a user, client device 4A may transmit a file unlock message to server device 38 to release an editing lock associated with file 22 and effectively check file 22 back into document management system 40. Rather than transmit file 22 to server device 38 upon releasing the editing lock associated with file 22, client device 4A maintains file 22 locally at client device 4A. In response to determining that file 22 is unlocked, document management system 40 transmits file upload request 30 to client device 4A.

File upload request 30 includes an indication of file 22 to request that client device 4A transmit file 22 to server device 38. As an example, file upload request 30 may include one or more of a file name of file 22, a file version of file 22, or other information to uniquely identify file 22. In addition, file upload request 30 may include an indication of server device 38 or a server of server device cluster 46 (e.g., a MAC address, IP port number, etc.) to indicate the server device to which client 4A is requested to upload file 22.

Document management agent 9 executing on client device 4A receives file upload request 30. In response, document management agent 9 transmits file 22 to server device 38. In certain examples, as when file upload request 30 includes an indication of a destination server of server device cluster 46, rather than transmit file 22 to server device 38, document management agent 9 transmits file 22 to the indicated server device of server device cluster 46.

In the example of FIG. 1, document management system 40 receives file upload 32 including file 22 from client device 4A. Document management system 40 thereafter transmits file 22 to client device 4B. In addition, document management system 40 updates database 42 to associate an editing lock for file 22 with client device 4B. Client device 4B receives file download 36 including file 22 from document management system 40 of server device 38.

The techniques described above with respect to FIG. 1 may be applied with respect to modifications of file 22 by client device 4B. For example, client device 4B may edit file 22 and store the modified file 22 within local memory of client device 4B. In response to the modification, client device 4B may transmit a synchronization intent message to document management system 40. Such a synchronization intent message from client device 4B notifies document management system 40 that client device 4B modified file 22, and that client device 4B stores the current version of file 22. As such, document management system 40 updates database 42 to associate the storage location of the current version of file 22 with client device 4B. Similarly, client device 4B may transmit a file unlock message to document management system 40 to effectively check file 22 back into document management system 40 while maintaining the current version of file 22 at client device 4B. In response to receiving an editing request for file 22 from a third client device, such as a client device 4C (not illustrated), document management system 40 determines that client device 4B has unlocked file 22, transmits a file upload request to client device 4B, receives file 22 from client 4B, and transmits file 22 to the third client device.

As such, techniques described herein may reduce the amount of network communications required to manage synchronization and access to a current version of a file associated with a document management system. Rather than transmit an updated file to the server each time the file is modified by a client device, the techniques allow a notification message to be sent to the server device indicating that the client device modified the file. The notification message may be much smaller than the modified file itself. As such, the amount of network communications required to synchronize a current version of a file may be reduced. Moreover, instead of transmitting the updated file to the server device upon completion of the editing process, techniques described herein allow the client device to store the modified file locally and transmit the file to the server on demand, thereby possibly further reducing the amount of network communications required to manage access and synchronization of a file associated with a document management system.

Figure 2:
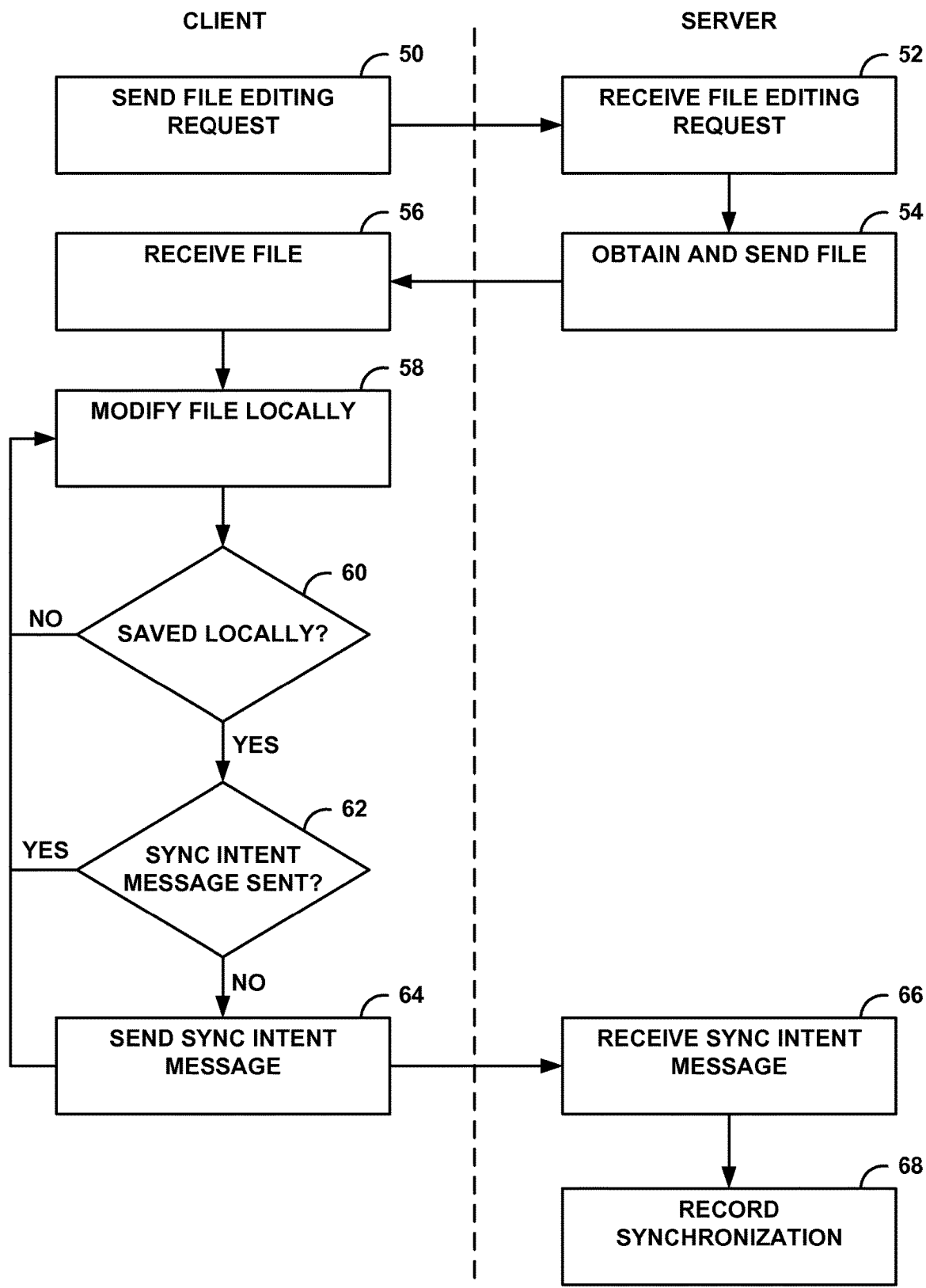
FIG. 2 is a flow diagram illustrating an example operation of a client device of the communication system of FIG. 1 in further detail.

FIG. 2 is a flow diagram illustrating an example operation of client device 4A of the communication system of FIG. 1 in further detail. A client device may send a file editing request to a server device to request access to edit a file (50). For instance, document management 9 executing on client device 4A may send file editing request 24 to server device 38 to request access to edit file 22. The file editing request includes an indication of the file (e.g., a file name of file 22, a file version of file 22, etc.) to enable the server device to uniquely identify the file associated with the editing request.

The server device may receive the file editing request (52). For instance, server device 38 may receive editing request 24 from client device 4A. The server device may obtain and send the requested file (54). As an example, document management system 40 of server device 38 may access database 42 to determine a storage location of a current version of file 22. Server device 38 may obtain the current version of file 22 from the identified storage location (e.g., client device 4B). Thereafter, server device 38 may transmit the current version of file 22 to client device 4A.

The client device may receive the transmitted file from the server device (56). For instance, client device 4A may receive file 22 from server device 38. The client device may modify the received file locally at the client device (58). For instance, client device 4A may receive file 22 from server device 38. As one example, file 22 may be a text file. Client device 4A may modify the text file locally at client device 4A using application 6 (e.g., a word processing application).

The client device may determine whether the modified file has been saved within local memory of the client device (60). For instance, application 6 executing on client device 4A may modify file 22. Application 6 may issue one or more system calls 10 to operating system 16 to cause file system 20 to modify, update, or otherwise store the modified file 22 at an underlying physical storage media of client device 4A (e.g., a hard disk, disc drive, or other computer-readable storage media). Operating system 16 may notify file system monitor 8 of the modification to file 22 using API 18. When file system monitor 8 determines that the modified file has not been saved locally at client device 4A (e.g., file system monitor 8 has not been notified of a file modification event associated with file 22) ("NO" branch of 60), client device 4A may continue to modify the received file.

When file system monitor 8 determines that the modified file has been saved locally at client device 4A (e.g., operating system 16 notifies file system monitor 8 of a file modification event associated with file 22) ("YES" branch of 60), the client device may determine whether a synchronization intent message has been sent to the server device to notify the server device that the client device has modified the file (62). For instance, document management agent 9 may cause client device 4A to store a flag or other identifier to identify whether a synchronization intent message has previously been sent to the server device in response to a file modification event associated with the modified file. When the client device determines that a synchronization intent message has been sent to the server device ("YES" branch of 62), the client device may refrain from sending an additional synchronization intent message to the server device. As such, the client device may further modify and save the file without triggering additional synchronization intent messages. This may be advantageous to further decrease the amount of network communications associated with synchronization of the modified file among the server device and other client devices.

When the client device determines that a synchronization intent message has not been sent to the server device ("NO" branch of 62), the client device may send a synchronization intent message to the server device to notify the server device that the client device has modified the file (64). For example, file system monitor 8 executing on client device 4A may send synchronization intent message 28 to server device 38. As such, the synchronization intent message may be considered a file update notification message to notify the server device that the client device has modified the file.

The server device may receive the synchronization intent message (66), and may record the synchronization (68). For instance, server device 38 may receive synchronization intent message 28 from client device 4A including an indication of file 22. In response, document management system 40 may update database 42 to associate the synchronization intent with client device 4A.

In certain examples, the client device may send the updated file to the server device. For instance, the client device may determine that the modified file has been saved locally at the client device, and that the client device has received or generated a system shutdown event. For instance, a user of the client device may provide an input to cause the client device to shutdown (e.g., a user presses a power button of the client device, selects a shutdown option from a user interface of the client device, or otherwise indicates that the client device is to power down). As another example, the client device may receive a system shutdown command from another device, such as an administrator device, to cause the client device to generate a system shutdown event. As such, when in a shutdown state, the client device may not be available to respond to a request to upload the modified file to the server device. In such examples, the client device may send the modified file to the server device in response to the system shutdown event and prior to the client device shutting down. For instance, operating system 16 may notify document management agent 9 that the system shutdown event has been raised. Such notification may be implemented, in certain examples, using an API such as API 18. In response, document management agent 9 may cause client device 4A to transmit file 22 to server device 38 which may store the updated file 22 at file repository 44.

Figure 3:
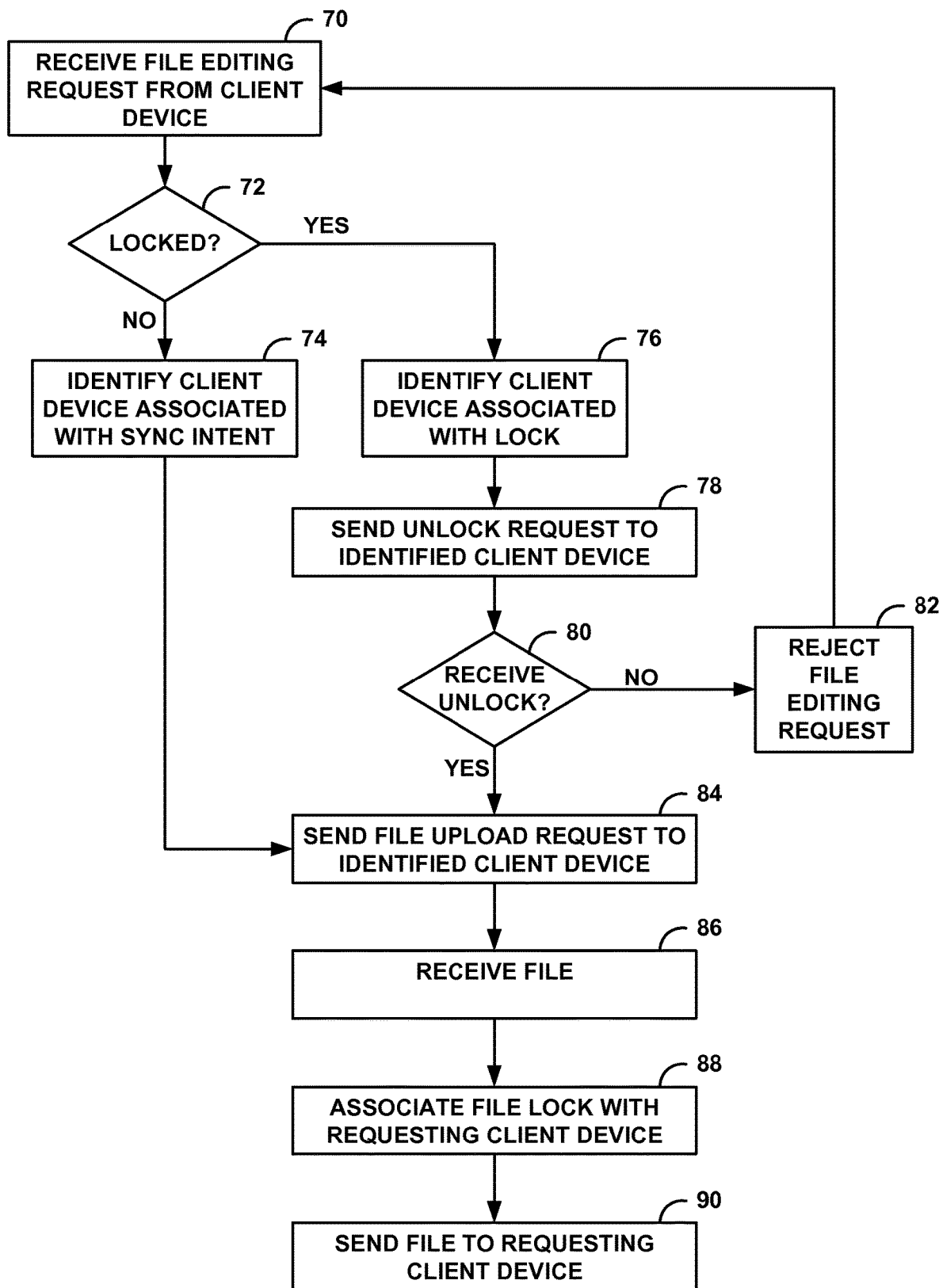
FIG. 3 is a flow diagram illustrating an example operation of a server device of the communication system of FIG. 1 in further detail.

FIG. 3 is a flow diagram illustrating an example operation of a server device of the communication system of FIG. 1 in further detail. The server device may receive a file editing request message from a client device (70). As an example, server device 38 may receive file editing request 24 from client device 4A to request access to edit file 22. The server device may determine whether the file associated with the file editing request is currently locked for editing by a client device (72). For instance, database 42 may include information to associate one or more files with a file lock identifier. In addition, database 42 may associate an identifier of a client device with the lock identifier. Document management system 40 may access database 42 to determine whether the file is currently locked.

When the file associated with the received editing request is not locked ("NO" branch of 72), the server device may identify a client device associated with a synchronization intent message associated with the file (74). As such, the server device may identify a storage location of the current (i.e., the most recently modified) version of the file. As an example, document management system 40 may access database 42 to determine an identifier of a client device (e.g., a MAC address, IP address and port number, and the like) to determine the storage location of the current version of the file. Thereafter, the server device may send a file upload request to the identified client device to request the client device to transmit the current version of the file to the server (84).

When the file associated with the received editing request is locked ("YES" branch of 72), the server device may identify the client device associated with the lock. For instance, database 42 may include information to associate the editing lock of the file with a particular client device. Document management system 40 may access database 42 to identify the client device associated with the lock. The server device may send an unlock request message to the identified client device (78). For example, a user of the identified client device associated with the editing lock may be finished editing the file, or otherwise willing to relinquish the lock. In response to receiving the unlock request, the identified client device may provide an indication to the user, such as through a graphical user interface provided by the client device, requesting the user to unlock the file. For instance, document management 9 may generate a popup window including a graphical textual message and one or more graphical buttons at a display of the client device to enable the user to provide an input in response to the unlock request. In such an example, when the user provides an input to confirm that the client device is to unlock the file, the document management agent 9 may send an unlock message, including an indication of the file, to the server device.

The server device may determine whether the server device has received an unlock confirmation message associated with the file from the identified client device (80). When the server device does not receive the unlock confirmation message from the identified client device ("NO" branch of 80), the server device may reject the file editing request (82). As an example, the server device may receive an unlock rejection message from the identified client device indicating that the client device does not relinquish the lock associated with the file. In such an example, the server device may reject the received file editing request. In certain examples, the server device may transmit a file editing rejection message to the requesting client device indicating that the editing request has been rejected.

As another example, the server device may wait for a predetermined threshold amount of time to receive an unlock confirmation message from the identified client device associated with the lock. When the server device does not receive the unlock confirmation message and the amount of time exceeds the threshold amount of time, the server device may reject the file editing request, and may transmit a file editing rejection message to the requesting client device.

When the server device receives the unlock confirmation message from the identified client device associated with the lock ("YES" branch of 80), the server device may send a file upload request to the identified client device (84). In addition, the server device may disassociate a file editing lock from an indication of the file and an indication of the client device, thereby unlocking the file for editing. As an example, server device 38 may update database 42 to disassociate a file editing lock from an indication of file 22 and an indication of client device 4A. In addition, server device may send upload request 30, including an indication of file 22, to document management agent 9 executing on client device 4A to request client 4A to transmit file 22 to server device 38.

As another example, rather than transmit an upload request message to the identified client device, the server device may transmit a message to the identified client device to initiate peer-to-peer communications between the identified client device and the requesting client device. For instance, the server device may transmit network communications information, such as a MAC address, IP address, port number, or combinations thereof, to enable the identified client device and requesting client device to initiate communications over a network. As such, rather than transmit the updated file (e.g., file 22) to the server device (e.g., server device 38), the identified client device (e.g., client device 4A) may transmit the updated file to the requesting client device (e.g., client device 4B) using the peer-to-peer communications.

In examples when the server device transmits the file upload request to the identified client device, the server device may receive the file the from the client device (86). For instance, server device 38 may receive file upload 32, including one or more portions of file 22, from document management agent 9 executing on client device 4A. The server device may associate an editing lock of the received with the requesting client device (88). For example, document management system 40 of server device 38 may update database 42 to associate the file editing lock of the file with the requesting client device (e.g., client 4B). The server device may send the file to the requesting client device (90). For instance, server device 38 may transmit file download message 36, including one or more portions of file 22, to client device 4B. The techniques described above may be implemented with respect to the requesting client (e.g., client device 4B). As an example, the server device may receive a request to edit the file from a third client device, separate from the identified client device and requesting client device in the example described above. As such, the techniques described above may be applicable to enable the server device to obtain and send the current version of the file to the third client device.

The techniques described in this disclosure may be implemented, at least in part, in hardware, software, firmware, or any combination thereof. For example, one or more aspects of this disclosure may be implemented using one or more computing devices. Such computing devices may include or be a part of an application server, database server, workstation, or other computing system. Examples of such computing devices may include, but are not limited to, one or more portable computing devices (e.g., a mobile phone, netbook, laptop, personal digital assistant (PDA), tablet device, and the like), one or more desktop computer, or one or more servers.

Various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Various aspects of the disclosure have been described. These and other aspects are within the scope of the following claims.

The invention claimed is:

1. A server device in communication with a first client device and a second client device over a network, comprising:
   one or more processors;
   a document management system executable by the one or more processors to:
   receive, from the first client device, a first editing request to edit a file locally maintained in a file system at the first client device;
   provide a lock to the first client device to enable the first client device to edit the file;
   receive, from the first client device, a synchronization intent message in response to providing the lock indicating that the file is modified;
   receive, from the first client device, an indication that the first client device has relinquished the lock, wherein the document management system does not receive any portion of the modified file as part of receiving the synchronization intent message and the indication the lock has been relinquished; and
   send a message to the first client device, in response to receiving a second editing request from the second client device, to initiate peer-to-peer communication for transferring the modified file directly from the first client device to the second client device.

2. The server device of claim 1, wherein the document management system sends the message to the first client device responsive to determining, based on the synchronization intent message, that the first client device stores a most recently modified version of the file.

3. The server device of claim 1, wherein the synchronization intent message further includes at least one of an indication of a time when the first client device modified the file, a version number of the file, or an identifier of a user of the first client device.

4. The server device of claim 1, wherein providing the lock further comprises: associate a file editing lock with an indication of the file and an indication of the first client device.

5. The server device of claim 4, wherein the document management system is further executable by the one or more processors to:
   responsive to receiving the second editing request from the second client device, send a file editing unlock request to the first client device, wherein receiving the indication that the first client device has relinquished the lock is in response to the file editing unlock request; and responsive to receiving the indication that the first client device relinquished the lock, disassociate the file editing lock from the indication of the file and the indication of the first client device.

6. The server device of claim 1, wherein the document management system is further executable by the one or more processors to:

associate a file editing lock with an indication of the file and an indication of the second client device for the second editing request;

receive a third editing request from a third client device;

responsive to receiving the third editing request from the third client device, send a file editing unlock request to the second client device;

receive an unlock rejection message from the second client device to indicate that the second client device does not relinquish the file editing lock associated with the file; and responsive to receiving the unlock rejection message, send a file editing rejection message to the third client device.

7. The server device of claim 1, wherein the document management system is further executable by the one or more processors to:

responsive to receiving the synchronization intent message, update an entry corresponding to the modified file in a file location database to indicate that the modified file has been modified by the first client device and stored to the first client device, wherein the file location database comprises a plurality of entries that includes the entry, and wherein each entry of the plurality of entries comprises an indication of a particular file, an indication of a particular client device of a plurality of client devices that is storing the particular file, and an indication of whether the particular file has been updated by the particular client device.

8. The server device of claim 7, wherein the document management system is further executable by the one or more processors to:

responsive to providing access to the modified file to the second client device:

send the modified file to the second client device; and update the entry corresponding to the modified file in the file location database to indicate that the modified file is stored on the second client device.

9. The server device of claim 1, wherein the first client device only sends one synchronization intent message to the server device for multiple modifications to the file, including modifications to the file that occur after the synchronization intent message was sent.

10. A client device in communication with a server having a document management system in communication with an additional client device, comprising:

one or more processors;

a computer-readable storage medium operable to store at least a file;

one or more applications executable by the one or more processors to modify the file stored on the computer-readable storage medium; and a document management agent executable by the one or more processors, responsive to the client device modifying the file and saving the modified file to the computer-readable storage medium, to:

send a first editing request to the document management system to edit the file locally maintained in a file system at the client device;

receive a lock from the document management system to enable the client device to edit the file;

send a synchronization intent message to the document management system, in response to receiving the lock, to notify the document management system that the file is modified;

send to the document management system an indication that the client device has relinquished the lock, wherein a document management agent does not send any portion of the modified file as part of the synchronization intent message and relinquishing the lock prior to receiving a peer-to-peer communication for the modified file from the document management system; and receive a message from the document management system, in response to the document management system receiving a second editing request from the additional client device, to initiate peer-to-peer communication for transferring the modified file directly to the additional client device.

11. The client device of claim 10, wherein the synchronization intent message is sent to the document management system responsive to determining that the client device modified the file.

12. The client device of claim 10, wherein the document management agent is further executable by the one or more processors to:

receive a file upload request from the document management system to request the modified file from the client device; and send the modified file to the document management system.

13. The client device of claim 10, wherein the synchronization intent message further includes at least one of an indication of a time when the client device modified the file, a version number of the file, or an identifier of a user of the client device.

14. The client device of claim 10, wherein the document management agent is further executable by the one or more processors to:

receive a file editing unlock request message from the document management system, wherein the file editing unlock request message includes an indication of the modified file; and send an unlock rejection message to the document management system to indicate that the client device does not relinquish an editing lock associated with the file.

15. The client device of claim 10, wherein the document management agent is further executable by the one or more processors to:

receive a file editing unlock request message from the document management system, wherein the file editing unlock request message includes an indication of the modified file; and send an unlock confirmation message to the document management system to indicate that the client device relinquishes an editing lock associated with the file.

16. The client device of claim 10, wherein only one synchronization intent message is sent to the server for multiple modifications to the file, including modifications to the file that occur after the synchronization intent message was sent.

* * * * *